UNITED STATES PATENT OFFICE
PTO – BOYERS, PA DUTY STATION

---

PAGE NOT AVAILABLE

PATENT NUMBER X5426 FOR THE ISSUE DATE 4/13/1829 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

X5426

April 3. 1829 4-3-1829

Gooding Holloway
Letters Patent

The Schedule referred to in these Letters Patent and making part of the same containing a description in the words of the said Gooding Holloway himself of his improvement in Razor Straps, The Strap is composed of wood and leather of a diamond or other form, and may consist of 1. 2. 3. or 4 sides around a [illegible] with the herein after mentioned and described ingredients for the purpose of grinding, honing, polishing or smoothing, and setting a fine edge to razors or other instruments requiring the same. The composition for coating or covering the leather after being glued to the stock is made and applied as follows viz. Bees wax 3 parts Spermaceti or mutton tallow 2 parts. Rosin one part to be melted together, and run into a cake with which the several different sides of the strap are to be rubbed until the leather is well saturated with it. Then for and upon the coarsest side intended for grinding denominated No 1. Emery of a suitable coarse grain is applied by dusting it through book muslin, and rubbed or worked into the composition or coating upon the leather by means of a glass roller until it becomes smooth, repeating the application of the cake or composition, dusting with emery and rolling or rubbing it in until the leather or surface of the strap is completely covered. for No 2, or the side designed for honing. A small portion of Prussian blue finely pulverized is to be added after a coat of emery of finer grain than the first. each to be dusted on separately and alternately in like manner, through muslin of a corresponding fineness rolled and worked in with composition same as before. No 3. or third side for setting a sharp edge smoothing &c. A light coat of the flour of emery is to be dusted as before through muslin of a still finer quality preceded by an ~~equal quantity~~ or coat of flour of emery repeated and worked in alternately with the composition same as before.

The last side or No 4. is to be lightly rubbed with the cake and then polished down to the most perfect smoothness with the glass

X5426 roller after which a small portion of Prussian Vermillion is applied and dust-
ing it over with a fine velvet or silk puff until the whole surface is
evenly covered. What the said Gooding Holloway considers as his im-
provement and for which he solicits and expects a patent is embraced in
the following particulars. First in preparing a composition with ad-
ditional ingredients of rosin [illegible] or tallow which produces a stron
adhesive quality. and of such permanently that it will not be sub-
ject to change. decay or peel off from the leather but on the contrary
grow firmer by using. thereby retaining and preserving entire upon the
surface or face of the strap its superior properties for a great
length of time. increasing its utility and value beyond any oth
er Strap hitherto manufactured or known
Secondly by the additional use of Prussian Blue the pores
of the second side are more perfectly filled up rendering it sol-
id and permanent and of the nature of a sharp [hone] Thirdly the ap-
plication and use of the flour of crocus which besides its fine pol-
ishing or smoothing property holds permanently an exceedingly
sharp and fine grit of a softer nature than Emery imparting
and preserving an indispensable qualification to the third side of
the strap. And lastly the Prussian Vermillion which operates
in giving the finishing stroke or finest possible edge. and also
prevents the surface of the last and delicate side of the strap from
glazing all which I claim as my improvement Chester January 2d 1829

Witness
J S Richardson
Peter Ogan

Gooding Holloway (Gooding Hollowi)

(April 3. 1829)